3,180,824
CONDITIONING OF WASTES
Richard C. Corey, Philadelphia, Pa., assignor to Pennsalt Chemicals Corporation, a corporation of Pennsylvania
Filed June 19, 1963, Ser. No. 289,016
4 Claims. (Cl. 210—8)

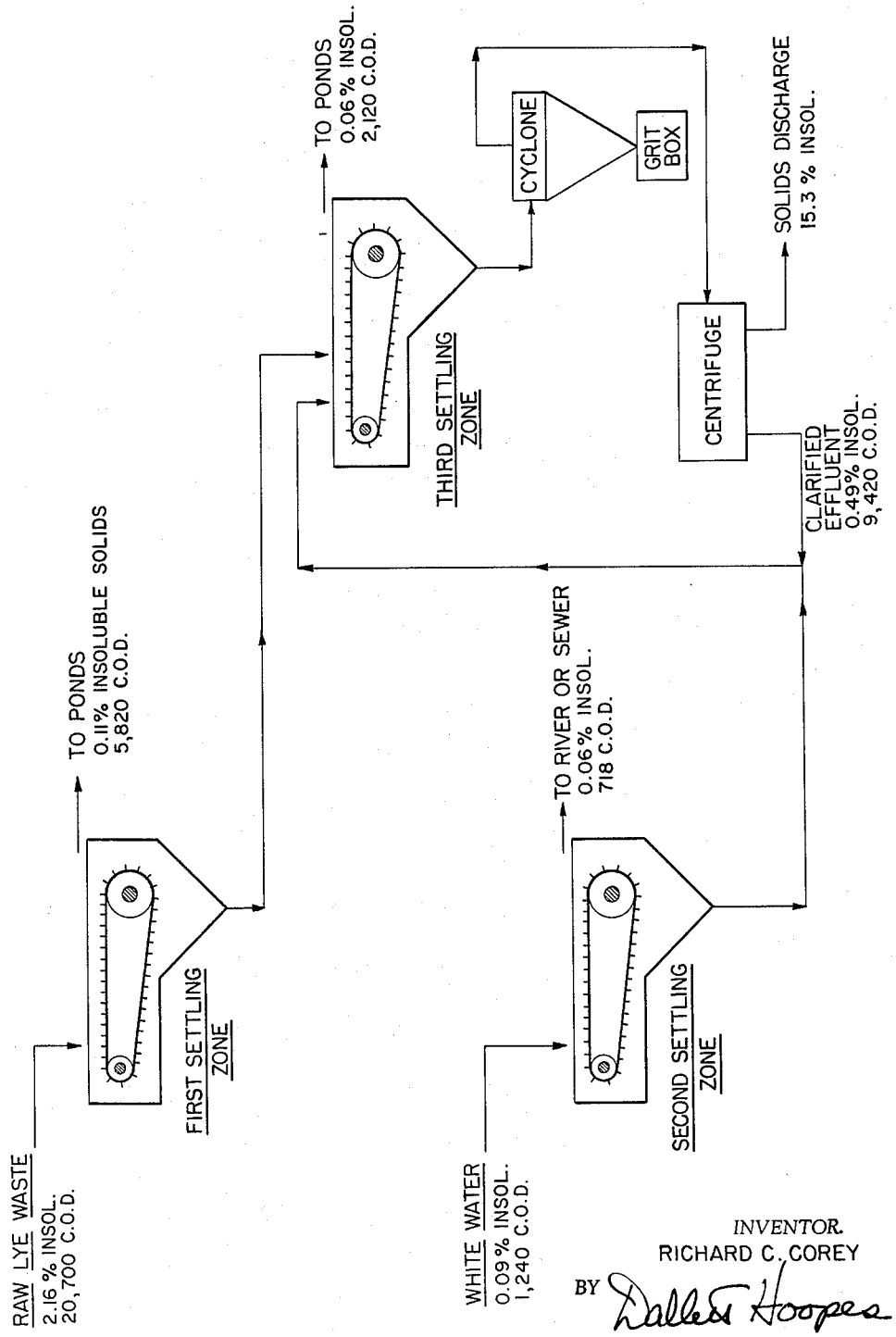

This invention relates to the conditioning of wastes. More specifically this invention contemplates the removal of a maximum amount of insoluble solids from certain waste liquids and the moderation of the alkaline characteristics of the solids and the liquids. The invention has particular application to the conditioning of potato wastes.

From a modern potato processing plant there are at least two waste liquids which present disposal problems to the processor. The first waste liquid is called peeler wash water or raw lye waste and arises in connection with the removal of skin and eyes of the potato by chemical means. It is now customary to soften the potato peel by soaking the potato for a limited period in sodium hydroxide. After the peel has been softened by this soaking, jets of water are played against the potato and wash off the peel. From this processing step there is discharged a dilute water mixture of potato solubles, potato insolubles and sodium hydroxide.

Another waste product from a potato processing plant is called white water and originates from hand-trimming, slicing, cooking, fluming and other steps. The solids in this stream may comprise starch, gelled starch, sugars, proteins, and very small potato pieces. Normally, while the total solids content of this stream is very small, the volume of the stream is large.

When excessive quantities of waste, such as is described above, are discharged into a river or other water body, pollution will result. One of the problems involved in pollution is the loss to the water body of oxygen necessary to maintain fish and other marine animal life. In this type of pollution there is, naturally, a concern on the part of Governmental agencies. It has been found that oxygen loss in a body of water may result from the increased presence of bacteriological micro-organisms whose metabolisms thrive on the oxygen and nutrients provided by the waste.

A measure of this condition of the water is called biological oxygen demand or simply B.O.D. and is expressed in parts oxygen required for the micro-organisms to digest aerobically, that is with the use of oxygen, the waste present in a million parts of the liquid. A somewhat comparable measurement of this condition is the chemical oxygen demand or C.O.D. which indicates the parts oxygen necessary to consume chemically the waste in a million parts of the liquid. In a waste conditioning system, therefore, the reduction of the B.O.D. and C.O.D. is an important measurement and it is an object of any such conditioning system to make the reduction as great as possible.

In the conditioning of wastes of high alkaline characteristic and containing vegetable solids, such as the raw lye waste from potato peeling, there have been attempts to reduce the B.O.D. and C.O.D. usually by permitting biological digestion to take place as the waste is maintained in a condition of absolute quiescence. After a short period of time with such digestion there has been a violent biologically-caused boiling of the waste with production of solubles and gases to an uncontrolled degree. This action has thrown the waste solids to the surface and they have moved off the liquid characterized by an extremely high B.O.D. and C.O.D.

Alternatively, in the prior art potato processing wastes comprising the peeling waste and the white water have been combined and the solids promptly removed from the lower level of the liquid. Because of their early removal from the liquid, the solids have not had the benefit of a digestion period. They retain their stickiness, characteristic of alkalinity, and are difficult to handle and are unsuitable as a cattle food because of their high caustic.

I have found that it is possible with controlled mild agitation and residence time to adjust the digestion of the lye waste, so that its alkalinity may be reduced and the production of solubles and gases minimized. I have also found that the insoluble solids from such digestion may be better separated from the liquid after being diluted by a liquid low in solubles, such as potato white water waste.

It is, therefore, an object of the present invention to provide a process for the conditioning of highly alkaline vegetable wastes.

It is a further object of the invention to remove maximum amounts of solids from a vegetable waste product.

Further objects of the invention will be apparent upon examination of the following specification, especially with reference to the attached drawings wherein the figure represents a schematic flow diagram of a process embodying the invention.

Since the invention was conceived and perfected in the treatment of potato waste product, it will be described in such application. Examples and the figure used in this specification and drawing, for instance, will be drawn from actual experience with such an application. However, it should be understood that the invention is not so limited but has other uses.

An understanding of the invention will be facilitated by a grasp of the characteristics of the waste liquid discharges of an actual potato plant. First, the peeler wash water or raw lye waste which is delivered from an actual plant at a relatively low rate, e.g. 90 gallons per minute, has an insoluble solids content of, for instance, 2.16%, with solubles at 1.1%. The chemical oxygen demand of the lye waste may be high, e.g. 20,000. The pH of the raw lye waste may range from 12 to 12.5.

On the other hand, the white water waste issues from a typical plant at a greater rate than the lye waste, and may, for instance, reach the order of 800 gallons per minute. Its insoluble solids content, substantially less than the raw lye waste content, may be 0.09%, while its chemical oxygen demand may be low, e.g. 1240. The white water is approximately neutral, having a pH from 6.9 to 7.5.

As shown in the figure, the raw lye waste having the characteristics described is delivered to a first settling zone or tank. Its temperature preferably is between 80 and 100° F., such as to be agreeable to the growth of bacteriological micro-organisms. In the tank, which may have a capacity of 100,000 gallons, aerobic digestion takes place, causing a slight decrease in the pH of the discharging liquids in a residence time of 10 to 12 hours. The first zone as well as the second zone are, in preferred embodiments of the invention, equipped with means for providing mild agitation. Such means may comprise a pair of aligned endless chains at the sides of the zone, the chains being connected by a number of spaced blades. The chains are slowly driven, the blades moving the solids slowly at, for instance, a foot a minute, to the underflow outlet. Alternatively, the agitating means may be in the form of rotary paddles which slowly roll the liquid under very mild agitation. From the first zone an upper layer of liquid is drawn off to a further treatment if desired or necessary, the drawn off liquid having a reduced chemical oxygen demand, e.g. 5,820, and a pH in the range of 9.4 to 9.8. The insoluble solids are settled out and become part of the underflow.

Turning now to the treatment of the white water waste, a second settling zone is provided and receives it at the rate indicated above. It should be noted that its soluble solids content is low, e.g. 0.13%. Insoluble solids are permitted to settle in the second zone which permits a residence time of about two hours, and a layer of liquid may be withdrawn from the top of the tank and delivered to the disposal system at a high rate, e.g. 644 gallons per minute, the draw-off comprising 0.06% insoluble solids at the pH of the delivered liquid, e.g. 6.9 to 7.5, and having a relatively low chemical oxygen demand, e.g. 718. This is usually tolerable when delivered directly to a sewer. The underflow from the second settling zone is delivered in a stream to the third settling tank at a rate of, for instance, 180 g.p.m.

From the first settling zone the underflow having a high chemical oxygen demand, e.g. 30,200, is delivered by pump or hydrostatic pressure to a third settling zone and it should be noted that partly due to the soaking-out of solids in the first settling zone and to the digestion processes, it is characterized by a substantial soluble solids content, e.g. 1.57%. In a preferred embodiment this liquid is delivered to the third settling zone at a relatively low rate, e.g. 25 gallons per minute.

In both the first and the third settling zones or tanks, biological digestion of the solids transpires, the microorganisms in their metabolisms producing organic acid to neutralize adjacent waste portions. The rate at which the digestion proceeds is controlled, actually inhibited by the mild agitation with movement of solids to the underflow outlet and deliberate withdrawal of the top layer of the liquid. The speed of either or both of these control means can be adjusted by one skilled in the art to reach optimum results.

The underflow from the third settling zone which may have a soluble solids content of 0.6% is pumped through a cyclone (as shown) to rid it of sand and other abrasives to a zone of centrifugal force which may be in the form of a solid bowl centrifuge having an internal screw adapted to move separated solids toward its discharge. Suitable for the centrifuge is one available under the trademark "Super-D-Canter" centrifuge. The solid discharge or dewatered sluge is delivered from the centrifuge at a rate of 13 gallons per minute and contains approximately 15.3% solids. The solids are, as a benefit of the neutralizing by digestion not sticky, and are of high nutritional value excellent for use as a cattle feed. Their lack of stickiness makes them easy to dry and further process.

The clarified effluent or discharge is thrown outwardly from the bowl liquid discharge port through the air within the centrifuge casing and is collected at the rate of approximately 57 gallons per minute and containing some insolubles, e.g. 0.49%, soluble solids, e.g. 0.51%, and a substantial chemical oxygen demand, e.g. 9,420. As shown this liquid discharge is combined with the stream from the underflow of the second settling zone and delivered to the third settling zone. It should be noted that the percent soluble content of the combined stream is low, e.g. 0.27%. The dilution of the centrifuge effluent by the second settling zone underflow consequently produces a combined liquid of density lower than that of the effluent and facilitates the settling of the solids in the third zone to make possible their return to and separation from the liquid by the centrifuge.

From an upper layer of the third settling zone liquid may be withdrawn for further processing if desired or necessary at a substantial rate, e.g. 194 gallons per minute, with low insoluble solids content, e.g. 0.06% and relatively low soluble solids content, e.g. 0.42%, a relatively low chemical oxygen demand, e.g. 2,120, and a low pH, e.g. in a range from 5.8 to 6.4.

Several benefits of the invention are to be noted. First, by controlled biological digestion processes the alkaline characteristic of the raw lye waste is reduced. Because this naturally keeps low the soluble solids content of the waste, and its specific gravity, it facilitates the centrifugal removal of solids. Secondly, the low solubles content of the white water waste is used to dilute the solubles content of the centrifuge effluent to make the insoluble solids separate out more easily upon reprocessing. Another benefit is the aerating effect of the centrifuge in discharging its effluent, increasing the oxygen content of the liquid introduced to the third settling zone from the centrifuge and supporting aerobic digestion.

Variations of the process described will be obvious to those skilled in the art and are contemplated within the scope of the appended claims. For instance, the centrifuge effluent may simply be diluted with water rather than the second settling zone underflow though as can be readily understood the use of the underflow would be preferred for reasons of economy. Chemical additives may be employed to foment the digestive processes. Aerators of conventional or special design may be included to supplement the action of the centrifuge in introducing air into liquid to make aerobic digestion possible. Further, the process may be simplified by reducing the number of settling zones, for instance, by combining the first and third zones into one single digestion zone.

Therefore, variations of the apparatus shown are possible within the scope of the appended claims. Hence while I have explained my invention with the aid of a particular embodiment thereof, it is to be understood that I do not wish to be limited to the specific arrangement illustrated and described from which departure can be made without departing from the spirit and scope of the invention.

I claim:

1. A process for conditioning for disposal potato peeling lye waste and potato white water including the steps of delivering them to first and second settling zones, respectively, delivering the underflow from the first zone to a third settling zone, delivering underflow from the second zone in a stream to the third settling zone, delivering the underflow from the third settling zone to a zone of centrifugation and therefrom separately discharging a solids discharge and a liquid effluent and combining the liquid effluent with the stream from the underflow of the second settling zone to the third settling zone whereby the liquid effluent having relatively high soluble solids content is diluted by the stream having relatively low soluble solids content causing the insoluble solids in the stream to more readily settle in the third settling zone and the zone of centrifugation, and removing from adjacent the top of each settling zone the conditioned discharges for the process.

2. The process of claim 1 wherein biological digestion in the first and third zones reduces the alkalinity of the liquids therein and the effluent in discharging from the zone of centrifugation picks up air to increase the likelihood of aerobic character of digestion.

3. The process of claim 1 wherein the first and third settling zones are combined.

4. A process for conditioning for disposal potato peeling lye waste having a pH in the range of 12 to 12.5 and potato white water having a pH in the range of 6.9 to 7.5 including the steps of delivering them to first and second settling zones, respectively, delivering the underflow from the first zone to a third settling zone, delivering underflow from the second zone in a stream to the third settling zone, delivering the underflow from the third settling zone to a zone of centrifugation and therefrom separately discharging the liquid and solids in the presence of air whereby the liquid discharge is aerated, delivering the aerated liquid to the stream of underflow from the second settling zone to assist aerobic digestion in the third settling zone, and removing from adjacent the top of each settling zone the conditioned effluents for the process, the discharge from the third settling tank having a pH in the range of 5.8 to 6.4.

(References on following page)

References Cited by the Examiner

UNITED STATES PATENTS 1,919,689  7/33  Elrod ---------------- 210—526
2,052,091  8/36  Green ---------------- 210—526

OTHER REFERENCES

Babbitt: Sewerage and Sewage Treatment, sixth ed., 1947, John Wiley, New York, pp. 362–367, 378, 379, 548 and 549 relied on.

Canham: Anaerobic Treatment of Food Canning Wastes, Proc. 5th Ind. Waste Conf., Purdue Univ., 1949, pp. 145–158.

Norgaard: Significant Characteristics of Sewage and Industrial Wastes, Sew. and Ind. Wastes, August 1950, vol. 22, pp. 1024–1033.

"Waters From Potato Starch Plants," Ambrose et al., Ind. and Eng. Chem., vol. 46, June 1954, pp. 1331–1334.

"Some Revised Concepts Concerning Biological Treatment," Sawyer et al., Proc. 9th Ind. Waste Conf., Purdue Univ. (1954), pp. 217–230.

"Design and Operation of a Complete Mixing Activated Sludge System," McKinney et al., Sewage and Ind. Wastes, March 1958, vol. 30, pp. 287–295.

MORRIS O. WOLK, *Primary Examiner.*